No. 616,364. Patented Dec. 20, 1898.
W. SHREEVE.
FILTERING DEVICE.
(Application filed Aug. 11, 1897.)
(No Model.)
FIG. 1.
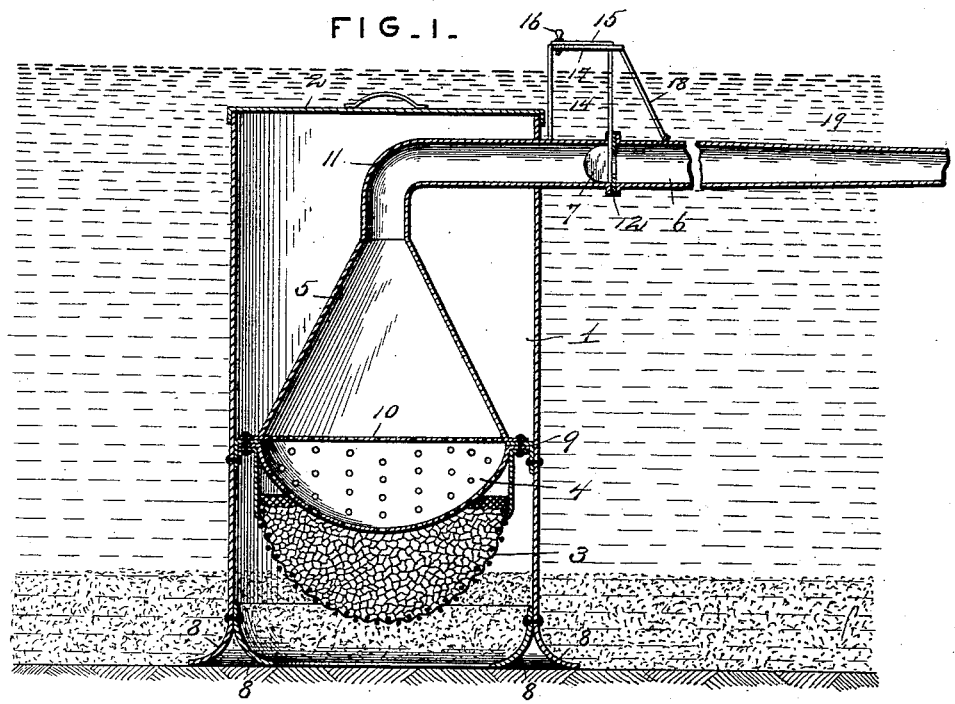
FIG. 2.
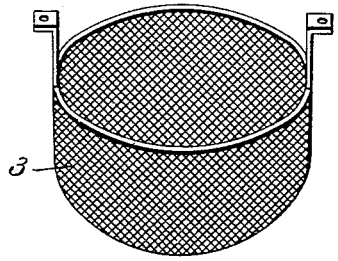
FIG. 3.
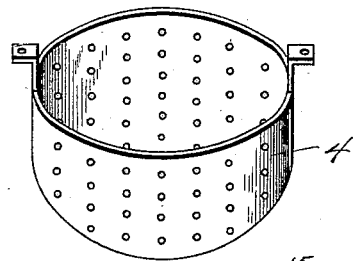
FIG. 5.
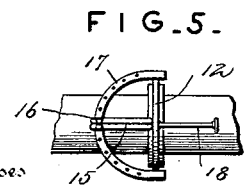
FIG. 4.
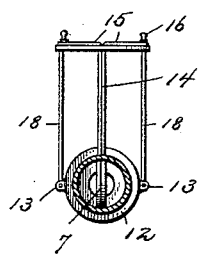
FIG. 6.
Witnesses
Harry L. Ames.
K. E. Nau
Inventor
Walter Shreeve.
by V. D. Stockbridge
his Attorney.

UNITED STATES PATENT OFFICE.

WALTER SHREEVE, OF ELM CREEK, NEBRASKA.

FILTERING DEVICE.

SPECIFICATION forming part of Letters Patent No. 616,364, dated December 20, 1898.

Application filed August 11, 1897. Serial No. 647,915. (No model.)

*To all whom it may concern:*

Be it known that I, WALTER SHREEVE, of Elm Creek, in the county of Buffalo and State of Nebraska, have invented certain new and useful Improvements in Filtering Devices; and I do hereby declare the following to be a full, clear, and exact description of the invention, such as will enable others skilled in the art to which it appertains to make and use the same.

This invention relates to filtering devices, and is designed especially for supplying water free from obstructing matter to mills and for purposes of irrigation.

The invention consists of certain novel constructions, combinations, and arrangements of parts, all of which will be hereinafter more particularly set forth and claimed.

In the accompanying drawings, forming part of this specification, Figure 1 represents a central vertical section through a filter embodying my invention. Fig. 2 represents an enlarged detail perspective view of the wire protecting-basket. Fig. 3 represents an enlarged detail perspective view of the perforated strainer. Fig. 4 represents an enlarged central transverse section through the valve-chamber. Fig. 5 is a top plan view of the gate-controlling mechanism. Fig. 6 is a detail perspective view of one of the gate members.

The filtering device contemplated in this invention is designed to be located on the bottom of a river or stream or canal, so as to be submerged, the whole filter being intended to be located below the low-water mark. In connection with the filter a discharge pipe or conduit is employed, the same connecting with the upper portion of the filter and from said upper portion extending along the stream and declining toward its terminus, the discharge pipe or conduit being preferably given a fall of about seven and one-half feet to the mile. Under the ordinary construction obstructing matter is apt to accumulate near the point where the water is taken from a stream and to find its way into the conduit, thus choking the same and requiring constant attention and expense in order to keep the conduit clear. The filter herein described is designed to prevent the conduit from becoming filled or choked with sand and drift, especially after a freshet. By the improvement herein described the gates which control the supply of water and its passage through the conduit are effectually protected and the water reaching the gate is clear and free from obstructing matter.

1 in the drawings represents the main casing; 2, the cover of the same; 3, the crate or basket; 4, the strainer; 5, the internal drum or funnel; 6, the discharge-pipe, and 7 7 the gates or valves.

The casing 1 is open at its bottom and is provided about its lower edge with two flaring flanges 8 8, downwardly diverging and adapted to become firmly seated in and upon the sand or gravel and prevent the gate from sinking. Said casing 1 is provided internally with an annular flange 9, upon which the lower end of the funnel or drum 5 rests and is supported. This flange 9 also serves for the attachment of the circular or disk-shaped perforated bottom 10, which is adapted to exclude all sand and gravel from the interior of the drum 5.

The meshed-wire basket 3 is secured some little distance below the perforated strainer 4, so as to rest upon the sand or gravel when the apparatus is applied in position in the water. The space between the basket 3 and the strainer 4 is preferably filled with gravel, so as to effectually prevent the passage of sand or other foreign substances. The upper end of the drum 5 is connected to an elbow-pipe 11, which passes through the wall of the casing 1 and is connected to a smaller discharge-pipe 6. Said elbow-pipe 11 has secured to its end an annular ring 12, provided upon diametrically opposite sides with apertured ears 13. This ring is adapted to act as a stop for the gate-valves 7 7, which are preferably semicircular in form, so as to extend over the opening of said ring 12 and lie firmly seated against the same when closed. Each of these valves is mounted upon a vertical shaft 14, which passes through the walls of the elbow-pipe 11, suitable packing being used to prevent any leaking at these points. Said rods or shafts 14 are provided at their upper ends with arms 15, in each of which is mounted a pin 16. Said arms 15 are adapted to slide over a perforated segmental plate 17, supported by braces 18, secured to the ears 13. By this means the valves may be held in any desired position by slipping the pin 16 through any of the apertures in the segmental plate 17.

The cover 2 is secured upon the casing 1 in any desired manner.

This apparatus is intended more particularly to be used for drawing water from quicksand or gravel, and is adapted to be sunk below the low-water level, so as to be invisible at all times. The relative size of the drum 5, elbow-pipe 11, and pipe 6 must be such that said drum and elbow may furnish about twice the amount of water needed to fill the discharge-pipe, so as to give the desired force and pressure to the water to cause the same to flow freely. By the peculiar mounting of the casing with its flaring flanges the same is prevented from sinking into the gravel or sand. This action is assisted by the basket or crate 3, which also rests upon the same and prevents the perforated strainer 4 from becoming choked with sand or other substances.

As the pipe leading to the gates or valves is of greater diameter than the main-line pipes, a tapering pipe-section 19 is inserted at this point to make their connection.

Having thus described my invention, what I claim as new, and desire to secure by Letters Patent, is—

1. In a submerged filter, the combination with a casing, of a meshed-wire basket located near the lower end of the same, a perforated strainer within the casing above the basket, leaving a space between the basket and strainer for the reception of filtering material, and a discharge-funnel located above the strainer within the casing, substantially as described.

2. In a submerged filter, the combination with a casing, of a meshed-wire basket mounted in the lower portion thereof, a strainer mounted in the casing above the basket, a funnel-shaped pipe or drum mounted within the casing in an inverted position above the strainer, a discharge-pipe connected to the contracted end of said pipe, and gates within said pipe controlling the passage of water therethrough, substantially as described.

3. In a submerged filter, the combination with a casing, of an annular flange secured within said casing at a point intermediate its height, a meshed-wire basket connected to and supported from said flange, a perforated strainer supported on said flange, an inverted funnel arranged above the strainer and supported on said flange, and a discharge-pipe connected to the upper contracted end of said funnel, substantially as described.

4. A submerged filter, comprising a casing, and filtering devices therein, in combination with a discharge-pipe leading from the casing and made in sections, a ring interposed between the adjoining ends of two sections and forming a valve-seat, and a valve or gate mounted in said pipe and designed to abut against said ring or seat, substantially as described.

5. In a submerged filter, the combination with a casing, and filtering devices therein, of a discharge-pipe made in sections having flanges at their abutting ends, a ring or valve seat interposed between said flanges, a pair of semicircular gates or valves pivotally mounted adjacent to said ring or seat and located within the pipe, operating stems for said valves, and means for operating said stems and maintaining the adjustment of the valves, substantially as described.

6. The combination with a submerged filter, of a discharge-pipe, semicircular valves or gates arranged therein and connected to stems or shafts which are journaled in parallel relation and close to each other, arms connected to said shafts, a perforated segmental plate over which said arms travel, and pins removably fitted in said arms and designed to engage said plate, substantially as and for the purpose described.

In testimony whereof I have signed this specification in the presence of two subscribing witnesses.

WALTER SHREEVE.

Witnesses:
WELLINGTON POTTER,
O. J. LLOYD.